US008397117B2

(12) United States Patent
Laaksonen et al.

(10) Patent No.: US 8,397,117 B2

(45) Date of Patent: Mar. 12, 2013

(54) METHOD AND APPARATUS FOR ERROR CONCEALMENT OF ENCODED AUDIO DATA

(75) Inventors: Lasse Juhani Laaksonen, Tampere (FI); Mikko Tapio Tammi, Tampere (FI); Adriana Vasilache, Tampere (FI); Anssi Sakari Rämö, Tampere (FI)

(73) Assignee: Nokia Corporation, Espoo (FI)

(*) Notice: Subject to any disclaimer, the term of this patent is extended or adjusted under 35 U.S.C. 154(b) by 1161 days.

(21) Appl. No.: 12/482,067

(22) Filed: Jun. 10, 2009

(65) Prior Publication Data

US 2010/0115370 A1 May 6, 2010

Related U.S. Application Data

(60) Provisional application No. 61/061,572, filed on Jun. 13, 2008.

(51) Int. Cl.
*H04L 1/20* (2006.01)

(52) U.S. Cl. .......................................................... 714/747

(58) Field of Classification Search ................... 714/747
See application file for complete search history.

(56) References Cited

U.S. PATENT DOCUMENTS

| | | | | |
|---|---|---|---|---|
| 5,144,671 | A | 9/1992 | Mazor et al. | |
| 5,148,487 | A * | 9/1992 | Nagai et al. | 704/265 |
| 5,305,332 | A * | 4/1994 | Ozawa | 714/747 |
| 5,321,793 | A | 6/1994 | Drogo De Iacovo et al. | |
| 5,406,632 | A * | 4/1995 | Sogo et al. | 714/747 |
| 5,797,121 | A | 8/1998 | Fette et al. | 704/230 |
| 5,825,320 | A | 10/1998 | Miyamori et al. | |
| 5,970,442 | A | 10/1999 | Timner | |
| 6,473,016 | B2 | 10/2002 | Piirainen et al. | |
| 6,775,649 | B1 * | 8/2004 | DeMartin | 704/201 |
| 6,810,377 | B1 * | 10/2004 | Ho et al. | 704/208 |
| 6,985,856 | B2 * | 1/2006 | Wang et al. | 704/226 |
| 7,047,187 | B2 * | 5/2006 | Cheng et al. | 704/219 |
| 7,069,208 | B2 * | 6/2006 | Wang | 704/211 |
| 7,650,280 | B2 * | 1/2010 | Tsuchinaga et al. | 704/207 |
| 8,068,926 | B2 * | 11/2011 | Andersen | 700/94 |
| 2005/0065783 | A1 | 3/2005 | Ojala et al. | |
| 2006/0093048 | A9 * | 5/2006 | Taleb | 375/259 |
| 2006/0184363 | A1 | 8/2006 | McCree et al. | |

(Continued)

FOREIGN PATENT DOCUMENTS

| | | | |
|---|---|---|---|
| WO | 2004059894 | A2 | 7/2004 |
| WO | 2007051124 | A1 | 5/2007 |

(Continued)

OTHER PUBLICATIONS

Office Action received in corresponding Chinese Application No. 200980121952.6, Dated Dec. 23, 2011, 20 pages.

(Continued)

*Primary Examiner* — Stephen M Baker

(74) *Attorney, Agent, or Firm* — Harrington & Smith

(57) ABSTRACT

A method of frame error concealment in encoded audio data comprises receiving encoded audio data in a plurality of frames; and using saved one or more parameter values from one or more previous frames to reconstruct a frame with frame error. Using the saved one or more parameter values comprises deriving parameter values based at least part on the saved one or more parameter values and applying the derived values to the frame with frame error.

24 Claims, 6 Drawing Sheets

U.S. PATENT DOCUMENTS

| | | | | |
|---|---|---|---|---|
| 2006/0277039 | A1 | 12/2006 | Vos et al. | |
| 2007/0156397 | A1 | 7/2007 | Chong et al. | 704/229 |
| 2009/0043574 | A1 * | 2/2009 | Gao et al. | 704/223 |
| 2009/0271204 | A1 | 10/2009 | Tammi | |
| 2010/0088089 | A1 * | 4/2010 | Hardwick | 704/208 |
| 2010/0274555 | A1 | 10/2010 | Laaksonen et al. | |
| 2011/0125505 | A1 * | 5/2011 | Vaillancourt et al. | 704/500 |

FOREIGN PATENT DOCUMENTS

| | | | |
|---|---|---|---|
| WO | 2008062959 | A1 | 5/2008 |

OTHER PUBLICATIONS

International Search Report and Written Opinion of the International Searching Authority for PCT Application No. PCT/FI2009/050403, dated Sep. 18, 2009, 12 pages.

Parikh et al., "Frame Erasure Concealment Using Sinusoidal Analysis-Synthesis and Its Application to MDCT-Based Codecs", In Proceedings of the IEEE International Conference on Acoustics, Speech, and Signal Processing, Jun. 2000.

* cited by examiner 210
212
214
220
222
224
230
240
signal A
signal B
"good frame"
reconstructed "bad frame"

METHOD AND APPARATUS FOR ERROR CONCEALMENT OF ENCODED AUDIO DATA

FIELD OF INVENTION

This invention relates to encoding and decoding of audio data. In particular, the present invention relates to the concealment of errors in encoded audio data.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Embedded variable rate coding, also referred to as layered coding, generally refers to a speech coding algorithm which produces a bit stream such that a subset of the bit stream can be decoded with good quality. Typically, a core codec operates at a low bit rate and a number of layers are used on top of the core to improve the output quality (including, for example, possibly extending the frequency bandwidth or improving the granularity of the coding). At the decoder, just the part of the bit stream corresponding to the core codec, or additionally parts of or the entire bit stream corresponding to one or more of the layers on top of the core, can be decoded to produce the output signal.

The International Telecommunication Union Telecommunication Standardization Sector (ITU-T) is in the process of developing super-wideband (SWB) and stereo extensions to G.718 (known as EV-VBR) and G.729.1 embedded variable rate speech codecs. The SWB extension, which extends the frequency bandwidth of the EV-VBR codec from 7 kHz to 14 kHz, and the stereo extension to be standardized bridge the gap between speech and audio coding. The G.718 and G.729.1 are examples of core codecs on top of which an extension can be applied.

Channel errors occur in wireless communications networks and packet networks. These errors may cause some of the data segments arriving at the receiver to be corrupted (e.g., contaminated by bit errors), and some of the data segments may be completely lost or erased. For example, in the case of G.718 and G.729.1 codecs, channel errors result in a need to deal with frame erasures. There is a need to provide channel error robustness in the SWB (and stereo) extension, particularly from the G.718 point of view.

SUMMARY OF THE INVENTION

In one aspect of the invention, a method of frame error concealment in encoded audio data comprises receiving encoded audio data in a plurality of frames; and using saved one or more parameter values from one or more previous frames to reconstruct a frame with frame error. Using the saved one or more parameter values comprises deriving parameter values based at least part on the saved one or more parameter values and applying the derived values to the frame with frame error.

In one embodiment, the saved parameter values correspond to parameter values of one or more previous frames without errors. In one embodiment, the saved parameter values correspond to parameter values of the most recent previous frame without errors.

In one embodiment, the saved parameter values correspond to parameter values of a previous reconstructed frame with errors.

In one embodiment, the saved parameter values are scaled to maintain periodic components in higher frequencies.

In one embodiment, the saved parameter values include modified discrete cosine transform (MDCT) spectrum values. The MDCT spectrum values may be scaled for the entire higher frequency range in accordance with:

$$\text{for } k=0;k<L_{highspectrum};k{+}{+}\; m(k+L_{lowspectrum})=m_{prev}(k)^{*}\text{fac}_{spect}.$$

In one embodiment, the saved parameter values include sinusoid component values. The sinusoid component values may be scaled in accordance with:

$$\text{for } k=0;k<N_{sin};k{+}{+}\; m(\text{pos}_{sin}(k)+L_{lowspectrum})=m_{prev}(\text{pos}_{sin})(k))^{*}\text{fac}_{sin}.$$

In one embodiment, the scaling is configured to gradually ramp down energy for longer error bursts.

In another aspect of the invention, an apparatus comprises a decoder configured to receive encoded audio data in a plurality of frames; and use saved parameter values from a previous frame to reconstruct a frame with frame error. Using the saved parameter values includes scaling the saved parameter values and applying the scaled values to the frame with frame error.

In one embodiment, the saved parameter values correspond to parameter values of one or more previous frames without errors. In one embodiment, the saved parameter values correspond to parameter values of the most recent previous frame without errors. In one embodiment, the saved parameter values correspond to parameter values of a previous reconstructed frame with errors.

In one embodiment, the saved parameter values are scaled to maintain periodic components in higher frequencies.

In one embodiment, the saved parameter values include modified discrete cosine transform (MDCT) spectrum values. The MDCT spectrum values may be scaled for the entire higher frequency range in accordance with:

$$\text{for } k=0;k<L_{highspectrum};k{+}{+}\; m(k+L_{lowspectrum})=m_{prev}(k)^{*}\text{fac}_{spect}.$$

In one embodiment, the saved parameter values include sinusoid component values. The sinusoid component values may be scaled in accordance with:

$$\text{for } k=0;k<N_{sin};k{+}{+}\; m(\text{pos}_{sin}(k)+L_{lowspectrum})=m_{prev}(\text{pos}_{sin})(k))^{*}\text{fac}_{sin}.$$

In one embodiment, the scaling is configured to gradually ramp down energy for longer error bursts.

In another aspect, the invention relates to an apparatus comprising a processor and a memory unit communicatively connected to the processor. The memory unit includes computer code for receiving encoded audio data in a plurality of frames; and computer code for using saved parameter values from a previous frame to reconstruct a frame with frame error. The computer code for using the saved parameter values includes computer code for scaling the saved parameter values and applying the scaled values to the frame with frame error.

In one embodiment, the saved parameter values correspond to parameter values of one or more previous frames without errors. In one embodiment, the saved parameter values correspond to parameter values of the most recent previous frame without errors. In one embodiment, the saved parameter values correspond to parameter values of a previous reconstructed frame with errors.

In one embodiment, the saved parameter values are scaled to maintain periodic components in higher frequencies.

In one embodiment, the saved parameter values include modified discrete cosine transform (MDCT) spectrum values. The computer code for scaling may be configured to scale MDCT spectrum values for the entire higher frequency range in accordance with:

$$\text{for } k=0;k<L_{highspectrum};k{+}{+}\ m(k+L_{lowspectrum})=m_{prev}(k)*\text{fac}_{spec}.$$

In one embodiment, the saved parameter values include sinusoid component values. The computer code for scaling may be configured to scale sinusoid component values in accordance with:

$$\text{for } k=0;k<N_{sin};k{+}{+}\ m(\text{pos}_{sin}(k)+L_{lowspectrum})=m_{prev}(\text{pos}_{sin})(k))*\text{fac}_{sin}.$$

In one embodiment, the computer code scaling is configured to gradually ramp down energy for longer error bursts.

In another aspect, a computer program product, embodied on a computer-readable medium, comprises a computer code for receiving encoded audio data in a plurality of frames; and a computer code for using saved parameter values from a previous frame to reconstruct a frame with frame error. The computer code for using the saved parameter values includes computer code for scaling the saved parameter values and applying the scaled values to the frame with frame error.

In one embodiment, the saved parameter values correspond to parameter values of one or more previous frames without errors. In one embodiment, the saved parameter values correspond to parameter values of the most recent previous frame without errors. In one embodiment, the saved parameter values correspond to parameter values of a previous reconstructed frame with errors.

In one embodiment, the saved parameter values are scaled to maintain periodic components in higher frequencies.

In one embodiment, the saved parameter values include modified discrete cosine transform (MDCT) spectrum values. The computer code for scaling may be configured to scale MDCT spectrum values for the entire higher frequency range in accordance with:

$$\text{for } k=0;k<L_{highspectrum};k{+}{+}\ m(k+L_{lowspectrum})=m_{prev}(k)*\text{fac}_{spec}.$$

In one embodiment, the saved parameter values include sinusoid component values. The computer code for scaling may be configured to scale sinusoid component values in accordance with:

$$\text{for } k=0;k<N_{sin};k{+}{+}\ m(\text{pos}_{sin}(k)+L_{lowspectrum})=m_{prev}(\text{pos}_{sin})(k))*\text{fac}_{sin}.$$

In one embodiment, the computer code scaling is configured to gradually ramp down energy for longer error bursts.

These and other advantages and features of various embodiments of the present invention, together with the organization and manner of operation thereof, will become apparent from the following detailed description when taken in conjunction with the accompanying drawings.

BRIEF DESCRIPTION OF THE DRAWINGS

Example embodiments of the invention are described by referring to the attached drawings, in which.

DETAILED DESCRIPTION OF THE VARIOUS EMBODIMENTS

Figure 1:
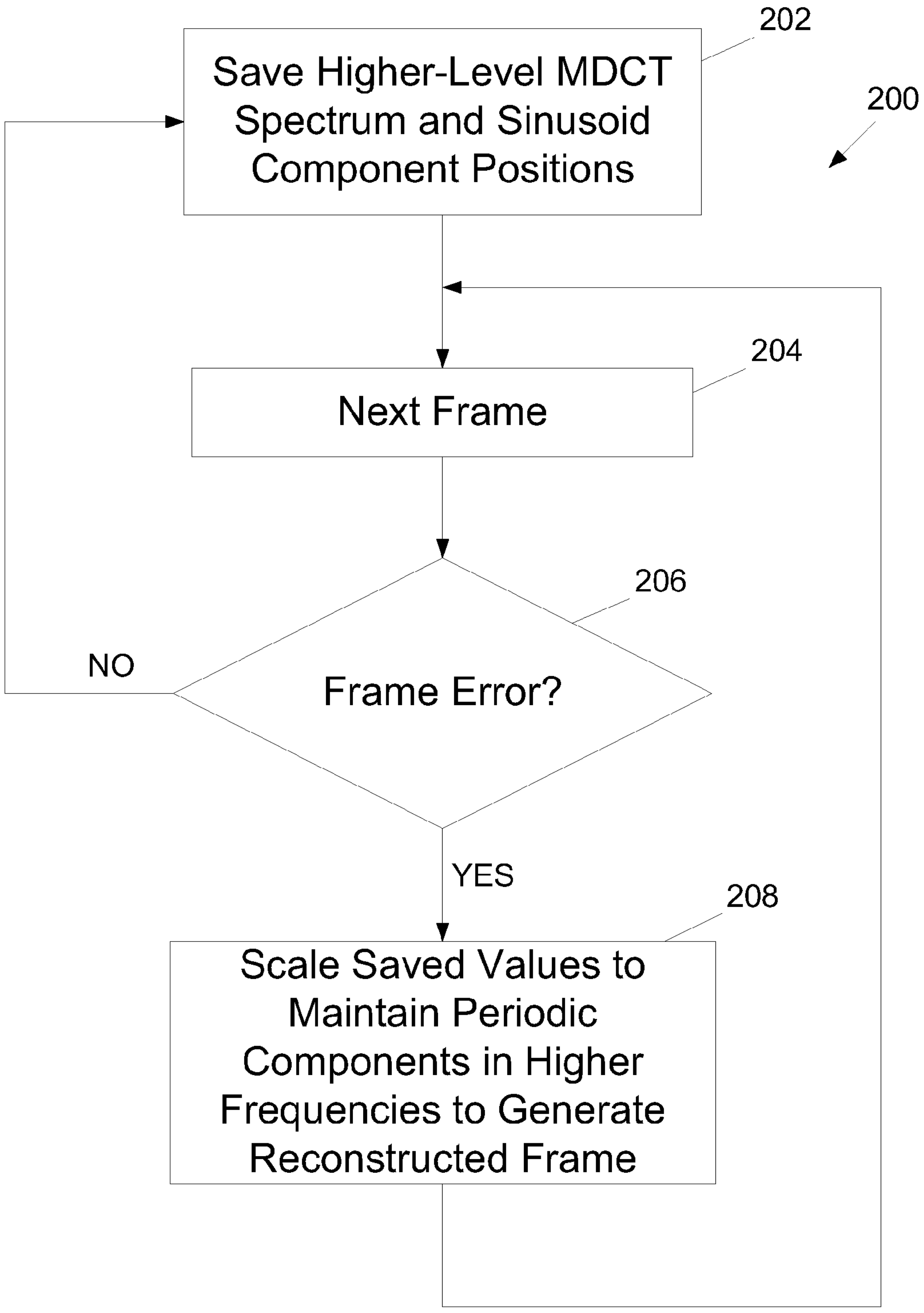
FIG. 1 is a flowchart illustrating an example frame error concealment method in accordance with an embodiment of the present invention.

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

Frame erasures can distort the core codec output. While the perceptual effects of frame erasures have been minimized by existing mechanisms used in the codecs, such as G.718, the signal shape in both time and frequency domains may be considerably affected, particularly in extensive number of frame losses. One example of the approach used for extension coding is to map the lower frequency content to the higher frequencies. In such an approach frame erasures on the lower frequency content may also affect signal quality on the higher frequencies. This may lead to audible and disturbing distortions in the reconstructed output signal.

An example embodiment of the extension coding framework for a core codec, such as the G.718 and G.729.1 codecs mentioned above, may utilize two modes. One mode may be a tonal coding mode, optimized for processing tonal signals exhibiting a periodic higher frequency range. The second mode may be a generic coding mode that handles other types of frames. The extension coding may operate for example in the modified discrete cosine transform (MDCT) domain. In other embodiments, other transforms, such as Fast Fourier Transform (FFT), may be used. In the tonal coding mode, sinusoids that approximate the perceptually most relevant signal components are inserted to the transform domain spectrum (e.g., the MDCT spectrum). In generic coding mode, the higher frequency range is divided into one or more frequency bands, and the low frequency area that best resembles the higher frequency content in each frequency band is mapped to the higher frequencies utilizing a set of gain factors (e.g., two separate gain factors). This one variation of the technique is generally referred to as a "bandwidth extension."

Embodiments of the present invention utilize extension coding parameters of the example framework described above (i.e., a framework) employing generic and tonal coding modes, for frame error concealment in order to minimize the number of disturbing artifacts and to maintain the perceptual signal characteristics of the extension part during frame errors.

In one embodiment, the error concealment is implemented as part of an extension coding framework including a frame-based classification, a generic coding mode (e.g. a bandwidth extension mode) where the upper frequency range is constructed by mapping the lower frequencies to the higher frequencies, and a tonal coding mode where the frame is encoded by inserting a number of sinusoid components. In another embodiment, the error concealment is implemented as part of an extension coding framework that employs a combination of these methods (i.e. a combination of mechanisms used in the generic coding mode and the tonal coding mode) for all frames without a classification step. In yet another embodiment, additional coding modes to the generic mode and the tonal mode may be employed.

Extension coding employed in conjunction with a certain core coding, for example with G.718 core codec, provides various parameters which may be utilized for the frame error concealment. Available parameters in the extension coding framework may comprise: core codec coding mode, extension coding mode, generic coding mode parameters (e.g., lag indices for bands, signs, a set of gains for the frequency band mapping, time-domain energy adjustment parameters, and similar parameters as used for the tonal mode), and tonal mode parameters (sinusoid positions, signs, and amplitudes). In addition, the processed signal may consist either of single channel or of multiple channels (e.g., stereo or binaural signal).

Embodiments of the present invention allow the higher frequencies to be maintained perceptually similar as in the preceding frame for individual frame errors, while ramping the energy down for longer error bursts. Thus, embodiments of the present invention may also be used in switching from a signal including the extension contribution (e.g. a SWB signal) to a signal consisting of core codec output only (e.g. WB signal), which may happen, for example, in an embedded scalable coding or transmission when the bitstream is truncated prior to decoding.

Since the tonal mode is generally used for parts of the signal that have a periodic nature in the higher frequencies, certain embodiments of the present invention use the assumption that these qualities should be preserved in the signal also during frame errors, rather than producing a point of discontinuity. While abruptly changing the energy levels in some frames may create perceptually annoying effects, the aim in generic frames may be to attenuate the erroneous output. In accordance with certain embodiments of the present invention, the ramping down of the energy is done rather slowly, thus maintaining the perceptual characteristics of the previous frame or frames for single frame errors. In this regard, embodiments of the present invention may be useful in switching from extension codec output to core codec only output (e.g., from SWB to WB, when the SWB layers are truncated). Due to the overlap-add nature of the MDCT, the contribution from the previous (valid) frame influences the first erased frame (or the frame immediately after a bitstream truncation), and the difference between a slow ramp down of energy and inserting a frame consisting of samples with zero value may not necessarily be pronounced for some signals.

Reference is now made to FIG. 1 which illustrates an example process 200 for frame error concealment in accordance with an embodiment of the present invention. To implement various embodiments of the present invention, the higher layer MDCT spectrum and information about the sinusoid components, for example positions, signs and amplitudes, from one or more previous frames may be kept in memory to be used in the next frame should there be a frame error (block 202). At block 204, the process proceeds to the next frame and determines whether a frame error exists (block 206). If no error exists, the process returns to block 202 and saves the above-noted parameters. During a frame error, the MDCT spectrum of the one or more previous frames is thus available and can be processed, for example scaled down, and passed along as the high frequency contribution for the current frame. In addition, the information regarding the sinusoidal components, for example positions, signs and amplitudes, in the MDCT spectrum are also known. Accordingly, a reconstructed frame can be generated (block 208).

Figures 2A, 2B, 3A, 3B:
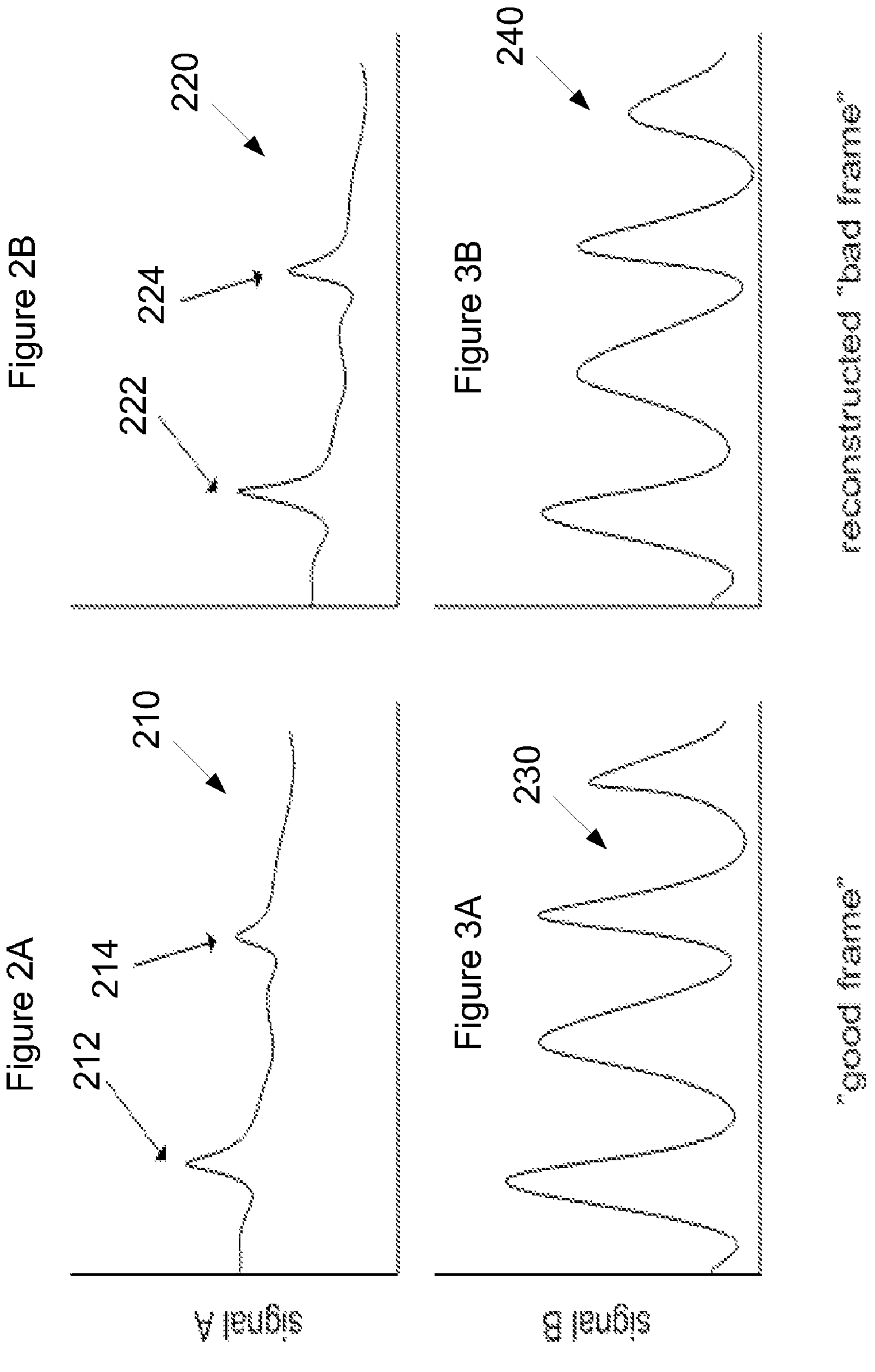
FIGS. 2A and 2B illustrate the application of frame error concealment method in accordance with an embodiment of the present invention to a generic frame.
FIGS. 3A and 3B illustrate the application of frame error concealment method in accordance with an embodiment of the present invention to a tonal frame.

FIGS. 2A, 2B, 3A and 3B illustrate example implementations of the frame error concealment in accordance with embodiments of the present invention. FIGS. 2A and 2B illustrate the effect of the application of a frame error concealment to a generic frame. In this regard, FIG. 2A illustrates a spectrum of a valid frame 210 with no frame error. As noted above, the higher layer MDCT spectrum and the sinusoid component information from one or more previous valid frames 210 may be saved. FIG. 2B illustrates an example of a spectrum of a reconstructed frame 220 replacing a missing frame after the application of the frame error concealment in accordance with embodiments of the present invention. As may be noted from FIGS. 2A and 2B, the energy of the content derived from the previous frame(s) (FIG. 2A) is attenuated more strongly, while a weaker attenuation is applied at the sinusoid components 212, 214, 222, 224.

FIGS. 3A and 3B illustrate the application of a frame error concealment to a tonal frame. In this regard, FIG. 3A illustrates a valid frame 230 with no frame error, and FIG. 3B illustrates a reconstructed frame 240 used to replace a missing frame after the application of the frame error concealment in accordance with embodiments of the present invention. For a tonal frame 230, 240, an even weaker attenuation is applied than for the sinusoid components 212, 214, 222, 224 of the generic signal of FIGS. 2A and 2B.

Thus, in accordance with embodiments of the present invention, the processing of the MDCT spectrum can be described as follows. A first scaling is performed for the entire higher frequency range:

$$\text{for } k=0; k<L_{highspectrum}; k{+}{+}\ m(k+L_{lowspectrum})=m_{prev}(k)^{*}\text{fac}_{spectr}$$

A second scaling is applied for the sinusoidal components as given by:

$$\text{for } k=0; k<N_{sin}; k{+}{+}\ m(\text{pos}_{sin}(k)+L_{lowspectrum})=m_{prev}(\text{pos}_{sin}(k))^{*}\text{fac}_{sin}.$$

In other embodiments, instead of applying a constant scaling factor to all frequency components, it is also possible to use a scaling function that, for example, attenuates the higher part of the high frequency range more than the lower part.

In accordance with embodiments of the present invention, the scaling factor values may be decided based on information such as the types of the preceding frames used for error concealment processing. In one embodiment, only the extension coding mode—e.g. the SWB mode—of the preceding valid frame is considered. If it is a generic frame, scaling factors of, for example, 0.5 and 0.6 are used. For a tonal frame, a scaling factor of 0.9 for the amplitudes of the sinusoidal components may be used. Thus, in this embodiment, there is no other content in the MDCT spectrum in tonal frames except for the sinusoid components, and the process to obtain the MDCT spectrum for the current frame, m(k), therefore, could be considerably simplified. In other embodiments, there may be content other than the sinusoids in what may be considered the tonal mode.

Note that, in certain embodiments, data from more than one of the previous frames may be considered. Further, some embodiments may use, for example, data from a single previous frame other than the most recent frame. In yet another embodiment, data from one or more future frames can be considered.

After the MDCT spectrum for the missing frame is constructed, it may be processed in a similar manner to a valid frame. Thus, an inverse transform may be applied to obtain the time-domain signal. In certain embodiments, the MDCT spectrum from the missing frame may also be saved to be used in the next frame in case that frame would also be missing and error concealment processing needs to be invoked.

In certain embodiments of the present invention, further scaling, now in the time-domain, may be applied to the signal. In the framework used here as an example, which can be used for example in conjunction with the G.718 or G.729.1 codecs, downscaling of the signal may be performed in the time domain, for example on a subframe-by-subframe basis over 8 subframes in each frame, provided this is seen necessary at the encoder side. In accordance with embodiments of the present invention, in order to avoid introducing unnecessarily strong energy content in the higher frequencies, two examples of measures that may be utilized to avoid this are presented next.

First, in case the preceding valid frame is a generic coding, a subframe-by-subframe downscaling may be carried out. It can utilize, e.g., the scaling values of the preceding valid frame or a specific scaling scheme designed for frame erasures. The latter may be, e.g., a simple ramp down of the current frame high-frequency energy.

Second, the contribution in the higher frequency band may be ramped down utilizing a smooth window over one or more missing (reconstructed) frames. In various embodiments, this action may be performed in addition to the previous time-domain scalings or instead of them.

The decision logic for the scaling scheme may be more complex or less complex in different embodiments of the present invention. In particular, in some embodiments the core codec coding mode may be considered along with the extension coding mode. In some embodiments some of the parameters of the core codec may be considered. In one embodiment, the tonal mode flag is switched to zero after the first missing frame to attenuate the sinusoidal components quicker in case the frame erasure state is longer than one frame.

Thus, embodiments of the present invention provide improved performance during frame erasures without introducing any annoying artifacts.

Figure 4:
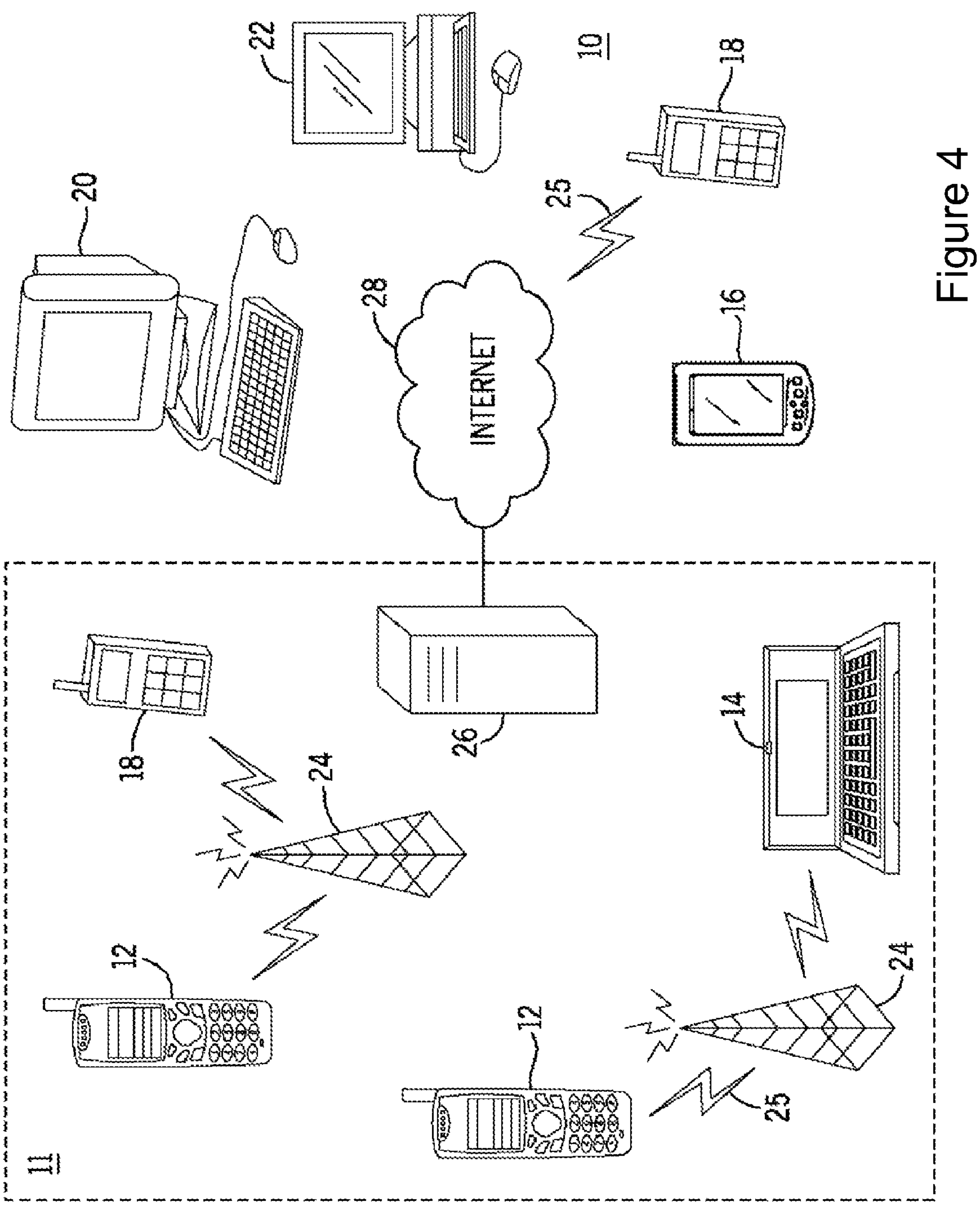
FIG. 4 is an overview diagram of a system within which various embodiments of the present invention may be implemented.

FIG. 4 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 4 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The example communication devices of the system 10 may include, but are not limited to, an electronic device 12 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 5:
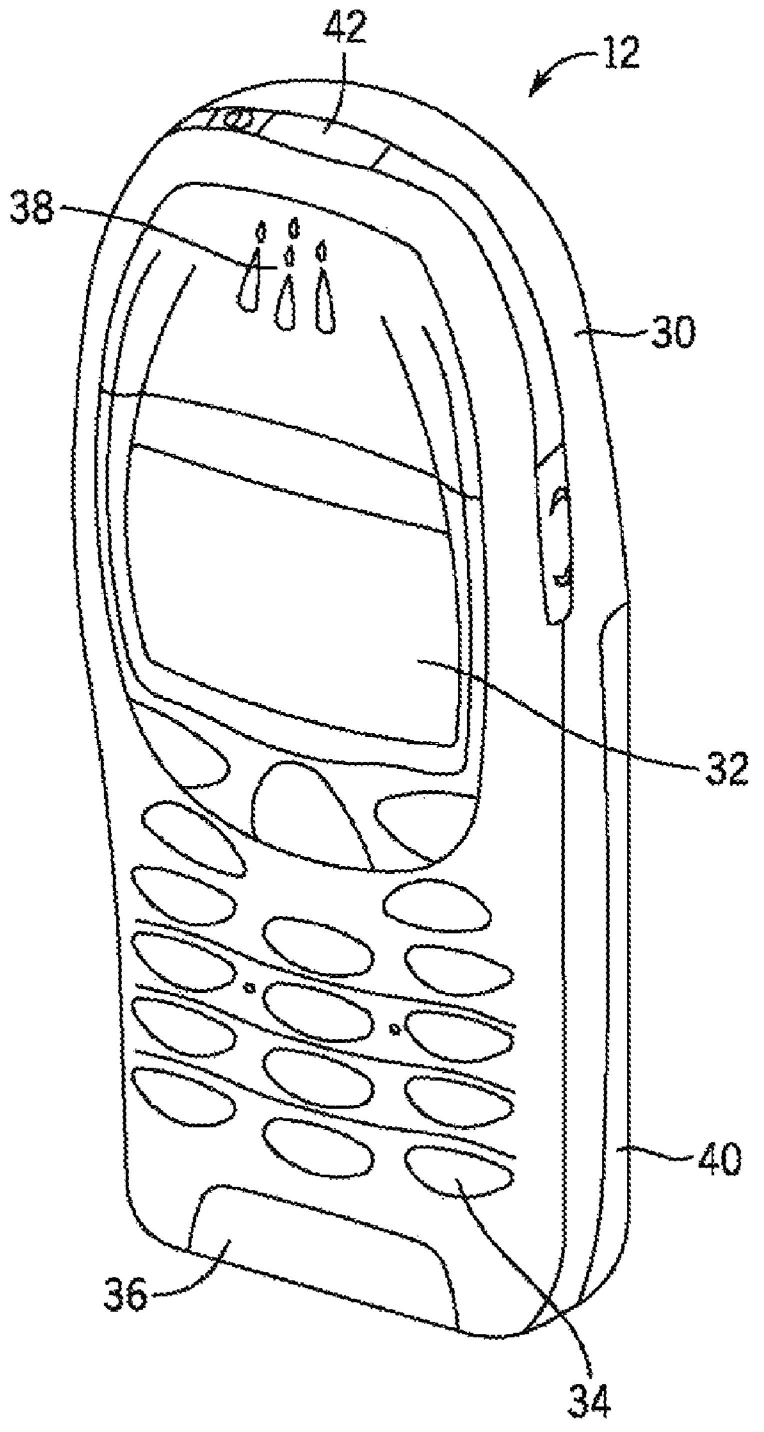
FIG. 5 illustrates a perspective view of an example electronic device which may be utilized in accordance with the various embodiments of the present invention.
Figure 6:
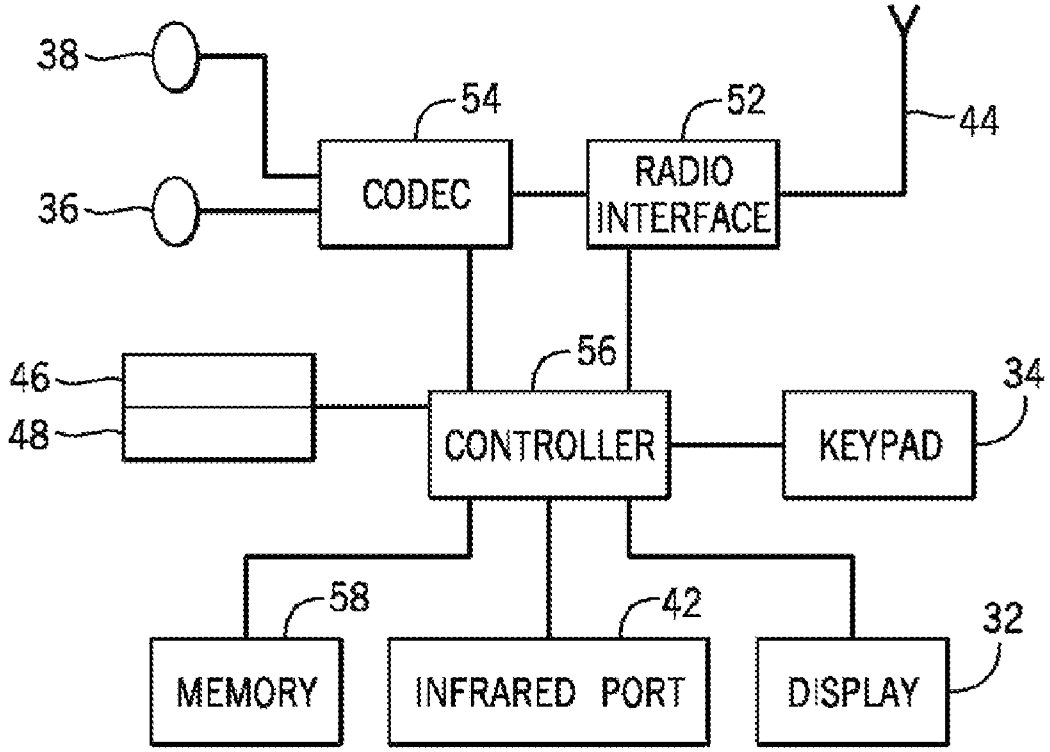
FIG. 6 is a schematic representation of the circuitry which may be included in the electronic device of FIG. 5.

FIGS. 5 and 6 show one representative electronic device 28 which may be used as a network node in accordance to the various embodiments of the present invention. It should be understood, however, that the scope of the present invention is not intended to be limited to one particular type of device. The electronic device 28 of FIGS. 5 and 6 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. The above described components enable the electronic device 28 to send/receive various messages to/from other devices that may reside on a network in accordance with the various embodiments of the present invention. Individual circuits and elements are all of a type well known in the art, for example in the Nokia range of mobile telephones.

Figure 7:
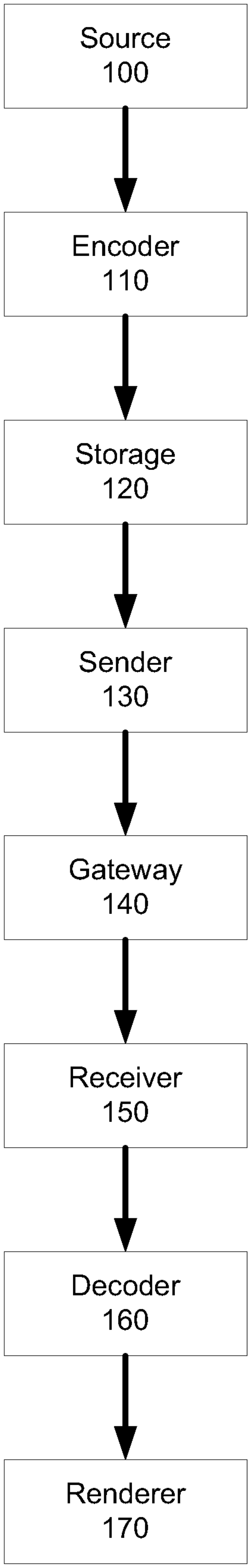
FIG. 7 is a graphical representation of a generic multimedia communication system within which various embodiments may be implemented.

FIG. 7 is a graphical representation of a generic multimedia communication system within which various embodiments may be implemented. As shown in FIG. 7, a data source 100 provides a source signal in an analog, uncompressed digital, or compressed digital format, or any combination of these formats. An encoder 110 encodes the source signal into a coded media bitstream. It should be noted that a bitstream to be decoded can be received directly or indirectly from a remote device located within virtually any type of network. Additionally, the bitstream can be received from local hardware or software. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in FIG. 7 only one encoder 110 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate “live”, i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the server 130 may reside in the same physical device or they may be included in separate devices. The encoder 110 and server 130 may operate with live real-time content, in which case the coded media bitstream is typically not stored permanently, but rather buffered for small periods of time in the content encoder 110 and/or in the server 130 to smooth out variations in processing delay, transfer delay, and coded media bitrate.

The server 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the server 130 encapsulates the coded media bitstream into packets. For example, when RTP is used, the server 130 encapsulates the coded media bitstream into RTP packets according to an RTP payload format. Typically, each media type has a dedicated RTP payload format. It should be again noted that a system may contain more than one server 130, but for the sake of simplicity, the following description only considers one server 130.

The server 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include MCUs, gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer or an RTP translator and typically acts as an endpoint of an RTP connection.

The system includes one or more receivers 150, typically capable of receiving, de-modulating, and de-capsulating the transmitted signal into a coded media bitstream. The coded media bitstream is transferred to a recording storage 155. The recording storage 155 may comprise any type of mass memory to store the coded media bitstream. The recording storage 155 may alternatively or additively comprise computation memory, such as random access memory. The format of the coded media bitstream in the recording storage 155 may be an elementary self-contained bitstream format, or one or more coded media bitstreams may be encapsulated into a container file. If there are multiple coded media bitstreams, such as an audio stream and a video stream, associated with each other, a container file is typically used and the receiver 150 comprises or is attached to a container file generator producing a container file from input streams. Some systems operate “live,” i.e. omit the recording storage 155 and transfer coded media bitstream from the receiver 150 directly to the decoder 160. In some systems, only the most recent part of the recorded stream, e.g., the most recent 10-minute excerption of the recorded stream, is maintained in the recording storage 155, while any earlier recorded data is discarded from the recording storage 155.

The coded media bitstream is transferred from the recording storage 155 to the decoder 160. If there are many coded media bitstreams, such as an audio stream and a video stream, associated with each other and encapsulated into a container file, a file parser (not shown in the figure) is used to decapsulate each coded media bitstream from the container file. The recording storage 155 or a decoder 160 may comprise the file parser, or the file parser is attached to either recording storage 155 or the decoder 160.

The coded media bitstream is typically processed further by a decoder 160, whose output is one or more uncompressed media streams. Finally, a renderer 170 may reproduce the uncompressed media streams with a loudspeaker or a display, for example. The receiver 150, recording storage 155, decoder 160, and renderer 170 may reside in the same physical device or they may be included in separate devices.

A sender 130 according to various embodiments may be configured to select the transmitted layers for multiple reasons, such as to respond to requests of the receiver 150 or prevailing conditions of the network over which the bitstream is conveyed. A request from the receiver can be, e.g., a request for a change of layers for display or a change of a rendering device having different capabilities compared to the previous one.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments of the present invention may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

In one aspect of the invention, a method of frame error concealment in encoded audio data comprises receiving encoded audio data in a plurality of frames; and using saved one or more parameter values from one or more previous frames to reconstruct a frame with frame error. Using the saved one or more parameter values comprises deriving parameter values based at least part on the saved one or more parameter values and applying the derived values to the frame with frame error.

In one embodiment, the saved parameter values correspond to parameter values of one or more previous frames without errors. In one embodiment, the saved parameter values correspond to parameter values of the most recent previous frame without errors. In one embodiment, the saved parameter values correspond to parameter values of a previous reconstructed frame with errors.

In one embodiment, the saved parameter values are scaled to maintain periodic components in higher frequencies.

In one embodiment, the saved parameter values include modified discrete cosine transform (MDCT) spectrum values. The MDCT spectrum values may be scaled for the entire higher frequency range in accordance with:

$$\text{for } k=0;k<L_{highspectrum};k{+}{+}\; m(k+L_{lowspectrum})=m_{prev}(k)*\text{fac}_{specr}$$

In one embodiment, the saved parameter values include sinusoid component values. The sinusoid component values may be scaled in accordance with:

$$\text{for } k=0;k<N_{sin};k{+}{+}\; m(\text{pos}_{sin}(k)+L_{lowspectrum})=m_{prev}(\text{pos}_{sin})(k))*\text{fac}_{sin}.$$

In one embodiment, the scaling is configured to gradually ramp down energy for longer error bursts.

In another aspect of the invention, an apparatus comprises a decoder configured to receive encoded audio data in a plurality of frames; and use saved parameter values from a previous frame to reconstruct a frame with frame error. Using the saved parameter values includes scaling the saved parameter values and applying the scaled values to the frame with frame error.

In one embodiment, the saved parameter values correspond to parameter values of one or more previous frames without errors. In one embodiment, the saved parameter values correspond to parameter values of the most recent previous frame without errors. In one embodiment, the saved parameter values correspond to parameter values of a previous reconstructed frame with errors.

In one embodiment, the saved parameter values are scaled to maintain periodic components in higher frequencies.

In one embodiment, the saved parameter values include modified discrete cosine transform (MDCT) spectrum values. The MDCT spectrum values may be scaled for the entire higher frequency range in accordance with:

$$\text{for } k=0;k<L_{highspectrum};k{+}{+}\; m(k+L_{lowspectrum})=m_{prev}(k)*\text{fac}_{specr}$$

In one embodiment, the saved parameter values include sinusoid component values. The sinusoid component values may be scaled in accordance with:

$$\text{for } k=0;k<N_{sin};k{+}{+}\; m(\text{pos}_{sin}(k)+L_{lowspectrum})=m_{prev}(\text{pos}_{sin})(k))*\text{fac}_{sin}.$$

In one embodiment, the scaling is configured to gradually ramp down energy for longer error bursts.

In another aspect, the invention relates to an apparatus comprising a processor and a memory unit communicatively connected to the processor. The memory unit includes computer code for receiving encoded audio data in a plurality of frames; and computer code for using saved parameter values from a previous frame to reconstruct a frame with frame error. The computer code for using the saved parameter values includes computer code for scaling the saved parameter values and applying the scaled values to the frame with frame error.

In one embodiment, the saved parameter values correspond to parameter values of one or more previous frames without errors. In one embodiment, the saved parameter values correspond to parameter values of the most recent previous frame without errors. In one embodiment, the saved parameter values correspond to parameter values of a previous reconstructed frame with errors.

In one embodiment, the saved parameter values are scaled to maintain periodic components in higher frequencies.

In one embodiment, the saved parameter values include modified discrete cosine transform (MDCT) spectrum values. The computer code for scaling may be configured to scale MDCT spectrum values for the entire higher frequency range in accordance with:

$$\text{for } k=0;k<L_{highspectrum};k{+}{+}\; m(k+L_{lowspectrum})=m_{prev}(k)*\text{fac}_{specr}$$

In one embodiment, the saved parameter values include sinusoid component values. The computer code for scaling may be configured to scale sinusoid component values in accordance with:

$$\text{for } k=0;k<N_{sin};k{+}{+}\; m(\text{pos}_{sin}(k)+L_{lowspectrum})=m_{prev}(\text{pos}_{sin})(k))*\text{fac}_{sin}.$$

In one embodiment, the computer code scaling is configured to gradually ramp down energy for longer error bursts.

In another aspect, a computer program product, embodied on a computer-readable medium, comprises a computer code for receiving encoded audio data in a plurality of frames; and a computer code for using saved parameter values from a previous frame to reconstruct a frame with frame error. The computer code for using the saved parameter values includes computer code for scaling the saved parameter values and applying the scaled values to the frame with frame error.

In one embodiment, the saved parameter values correspond to parameter values of one or more previous frames without errors. In one embodiment, the saved parameter values correspond to parameter values of the most recent previous frame without errors. In one embodiment, the saved parameter values correspond to parameter values of a previous reconstructed frame with errors.

In one embodiment, the saved parameter values are scaled to maintain periodic components in higher frequencies.

In one embodiment, the saved parameter values include modified discrete cosine transform (MDCT) spectrum values. The computer code for scaling may be configured to scale MDCT spectrum values for the entire higher frequency range in accordance with:

$$\text{for } k=0; k<L_{highspectrum}; k{+}{+}\, m(k+L_{lowspectrum})=m_{prev}(k)*fac_{spect}.$$

In one embodiment, the saved parameter values include sinusoid component values. The computer code for scaling may be configured to scale sinusoid component values in accordance with:

$$\text{for } k=0; k<N_{sin}; k{+}{+}\, m(pos_{sin}(k)+L_{lowspectrum})=m_{prev}(pos_{sin})(k))*fac_{sin}.$$

In one embodiment, the computer code scaling is configured to gradually ramp down energy for longer error bursts.

What is claimed is:

1. A method comprising:

receiving encoded audio data in a plurality of frames; and reconstructing at least one parameter for a frame with frame error based on at least one saved parameter value from at least one other frame of the plurality of frames, wherein reconstructing at least one parameter comprises:

deriving values for a first set of parameters based at least in part on said at least one saved parameter value using a first approach;

deriving values for a second set of parameters based at least in part on said at least one saved parameter value using a second approach; and applying the derived values for the first set and the second set of parameters to the frame with frame error, wherein the first set of parameters comprises modified discrete cosine transform spectrum values, and the second set of parameters comprises sinusoid components inserted in the modified discrete cosine transform spectrum.

2. The method according to claim 1, wherein the at least one saved parameter value comprise at least one of:

at least one parameter value of at least one previous frame without errors;

at least one parameter value of the most recent previous frame without error;

at least one parameter value of at lead one previous reconstructed frame with error; and at least one parameter value of at least one future frame.

3. The method according to claim 1, wherein said deriving values using the first approach comprises scaling said at least one saved parameter value with a first set of scaling factors, and said deriving values using the second approach comprises scaling said at least one saved parameter value with a second set of scaling factors.

4. The method according to claim 1, wherein the first set of parameters comprises parameters for a high frequency range.

5. The method according to claim 1, wherein the second set of parameters comprises a subset of the first set of parameters.

6. The method according to claim 1, wherein the first approach comprises deriving parameter values m for the first set of parameters in accordance with:

$$\text{for } k=0;\ k<L_{highspectrum};\ k{+}{+}\, m(k+L_{lowspectum})=m_{prev}(k)*fac_{spect}'$$

wherein $m_{prev}$ denotes said at least one saved parameter value and $fac_{spect}$ denotes respective scaling factor.

7. The method according to claim 1, wherein the second approach comprises deriving the parameter values m for the second set of parameters in accordance with:

$$\text{for } k=0;\ k<N_{sin};\ k{+}{+}\, m(pos_{sin}(k)=L_{lowspectrum})=m_{prev}(pos_{sin}(k))*fac_{sin}'$$

wherein $m_{prev}$ denotes said at least one saved parameter value, $fac_{sint}$ denotes respective scaling factor and $pos_{sin}$ is a variable descriptive of the positions of the second set of parameters within m and $m_{prev}$.

8. The method according to claim 1, wherein deriving parameter values comprises gradually ramping down signal energy.

9. An apparatus, comprising:

at least one processor; and at least one memory including computer program code, where the at least one memory and the computer program code are configured, with the at least one processor, to cause the apparatus to at least:

receive encoded audio data in a plurality of frames; and reconstruct at least one parameter for a frame with frame error based on at least one saved parameter value from at least one other frame of the plurality of frames, wherein reconstructing at least one parameter comprises:

deriving values for a first set of parameters based at least in part on said at least one saved parameter value using a first approach;

deriving values for a second set of parameters based at least part on said at least one saved parameter value using a second approach; and applying the derived values,for the first set and the second set of parameters to the frame with frame error, wherein the first set of parameters comprises modified discrete cosine transform spectrum values, and the second set of parameters comprises sinusoid components inserted in the modified discrete cosine transform spectrum.

10. The apparatus according to claim 9, wherein the at least one saved parameter value comprise at least one of:

at least one parameter value of at least one previous frame without errors, at least one parameter value of the most recent previous frame without error, at least one parameter value of at least one previous reconstructed frame with error, and at least one parameter value of at least one future frame.

11. The apparatus according to claim 9, wherein the at least one memory including the computer program code is configured with the at least one processor to cause the apparatus to derive values using the first approach comprising scaling said at least one saved parameter value with a first set of scaling factors, and derive said values using the second approach comprising scaling said at least one saved parameter value with a second set of scaling factors.

12. The apparatus according to claim 9, wherein the first set of parameters comprises parameters for a high frequency range.

13. The apparatus according to claim 9, wherein the second set of parameters comprises a subset of the first set of parameters.

14. The apparatus according to claim 9, wherein the first approach comprises deriving parameter values m for the first set of parameters in accordance with:

$$\text{for}k=0;\ k<L_{highspectrum};\ k{+}{+}\, m(k+L_{lowspectrum})=m_{prev}(k)*fac_{spect}'$$

wherein $m_{prev}$ denotes said at least one saved parameter value and $fac_{spect}$ denotes respective scaling factor.

15. The apparatus according to claim 9, wherein the second approach comprises deriving the parameter values m for the second set of parameters in accordance with:

$$\text{for}k=0;\ k<N_{sin};\ k{+}{+}m(\text{pos}_{sin}(k)+L_{lowspectrum})=m_{prev}(\text{pos}_{sin}(k))*\text{fac}_{sin}'$$

wherein $m_{prev}$ denotes said at least one saved parameter value, $\text{fac}_{sint}$ denotes respective scaling factor and $\text{pos}_{sin}$ is a variable descriptive of the positions of the second set of parameters within m and $m_{prev}$.

16. The apparatus according to claim 9, wherein deriving parameter values comprises gradually ramping down signal energy.

17. A computer-readable memory storing computer program code embodied therein for use with an apparatus, the computer program code executed by at least one processor to cause the apparatus to perform operations comprising:

receiving encoded audio data in a plurality of frames; and reconstructing at least one parameter for a frame with frame error based on at least one saved parameter value from at least one other frame of the plurality of frames, wherein the reconstructing at least one parameter comprises:

deriving values for a first set of parameters based at least part on said at least one saved parameter value using a first approach;

deriving values for a second set of parameters based at least part on said at least one saved parameter value using a second approach; and applying the derived values for the first set and the second set of parameters to the frame with frame error, wherein the first set of parameters comprises modified discrete cosine transform spectrum values, and the second set of parameters comprises sinusoid components inserted in the modified discrete cosine transform spectrum.

18. The computer-readable memory according to claim 17, wherein the at least one saved parameter value comprises at least one of at least one parameter value of at least one previous frame without errors, at least one parameter value of the most recent previous frame without error, at least one parameter value of at least one previous reconstructed frame with error, and at least one parameter value of at least one future frame.

19. The computer-readable memory according to claim 17, wherein said deriving values using the first approach comprises scaling said at least one saved parameter value with a first set of scaling factors, and said deriving values using the second approach comprises scaling said at least one saved parameter value with a second set of scaling factors.

20. The computer-readable memory according to claim 17, wherein the first set of parameters comprises parameters for a high frequency range.

21. The computer-readable memory according to claim 17, wherein the second set of parameters comprises a subset of the first set of parameters.

22. The computer-readable memory according to claim 17, wherein the first approach comprises deriving parameter values m for the first set of parameters in accordance with:

$$\text{for}k=0;\ k<L_{highspectrum};\ k{+}{+}m(k+L_{lowspectrum})=m_{prev}(k)*\text{fac}_{spect}'$$

wherein $m_{prev}$ denotes said at least one saved parameter value and $\text{fac}_{spec}$ denotes respective scaling factor.

23. The computer-readable memory according to claim 17, wherein the second approach comprises deriving the parameter values m for the second set of parameters in accordance with:

$$\text{for}k=0;\ k<N_{sin};\ k{+}{+}m(\text{pos}_{sin}(k)+L_{lowspectrum})=m_{prev}(\text{pos}_{sin}(k))*\text{fac}_{sin}'$$

wherein $m_{prev}$ denotes said at least one saved parameter value, $\text{fac}_{sint}$ denotes respective scaling factor and $\text{pos}_{sin}$ is a variable descriptive of the positions of the second set of parameters within m and $m_{prev}$.

24. The computer-readable memory according to claim 17, wherein deriving parameter values comprises gradually ramping down signal energy.

* * * * *

UNITED STATES PATENT AND TRADEMARK OFFICE
CERTIFICATE OF CORRECTION

PATENT NO. : 8,397,117 B2
APPLICATION NO. : 12/482067
DATED : March 12, 2013
INVENTOR(S) : Lasse Juhani Laaksonen et al.

It is certified that error appears in the above-identified patent and that said Letters Patent is hereby corrected as shown below:

In the Claims:

<u>In Claim 2</u>:
Column 13, line 47, "lead" should be deleted and -- least -- should be inserted.

<u>In Claim 7</u>:

Column 14, line 4, "$\begin{array}{l} k=0; k<N_{\sin}; k++ \\ m(pos_{\sin}(k)=L_{lowspectrum})=m_{prev}(pos_{\sin}(k))*fac_{\sin} \end{array}$" should be deleted and -- $\begin{array}{l} k=0; k<N_{\sin}; k++ \\ m(pos_{\sin}(k)+L_{lowspectrum})=m_{prev}(pos_{\sin}(k))*fac_{\sin} \end{array}$ -- should be inserted.

Column 14, line 7, "$fac_{sint}$" should be deleted and -- $fac_{sin}$ -- should be inserted.

<u>In Claim 15</u>:
Column 15, line 7, "$fac_{sint}$" should be deleted and -- $fac_{sin}$ -- should be inserted.

<u>In Claim 22</u>:
Column 16, line 25, "$fac_{spec}$" should be deleted and -- $fac_{spect}$ -- should be inserted.

<u>In Claim 23</u>:
Column 16, line 33, "$fac_{sint}$" should be deleted and -- $fac_{sin}$ -- should be inserted.

Signed and Sealed this
Ninth Day of July, 2013

Teresa Stanek Rea
*Acting Director of the United States Patent and Trademark Office*